(12) United States Patent
Shih et al.

(10) Patent No.: US 9,992,634 B2
(45) Date of Patent: Jun. 5, 2018

(54) RESOURCE SELECTION METHOD AND WIRELESS DEVICE

(71) Applicants: Industrial Technology Research Institute, Hsinchu (TW); National Taiwan University, Taipei (TW)

(72) Inventors: Mei-Ju Shih, Taichung (TW); Guan-Yu Lin, Nantou County (TW); Hung-Yu Wei, Taipei (TW)

(73) Assignees: Industrial Technology Research Institute, Hsinchu (TW); National Taiwan University, Taipei (TW)

( * ) Notice: Subject to any disclaimer, the term of this patent is extended or adjusted under 35 U.S.C. 154(b) by 144 days.

(21) Appl. No.: 14/951,515

(22) Filed: Nov. 25, 2015

(65) Prior Publication Data

US 2016/0165408 A1 Jun. 9, 2016

Related U.S. Application Data

(60) Provisional application No. 62/087,236, filed on Dec. 4, 2014.

(30) Foreign Application Priority Data

Jun. 29, 2015 (TW) .............................. 104120971 A

(51) Int. Cl.
*H04W 4/06* (2009.01)
*H04W 72/12* (2009.01)
(Continued)

(52) U.S. Cl.
CPC ........... *H04W 4/06* (2013.01); *H04W 72/005* (2013.01); *H04W 72/0446* (2013.01);
(Continued)

(58) Field of Classification Search
CPC ......... H04W 28/0215; H04W 28/0247; H04W 28/26; H04W 72/048; H04W 72/005;
(Continued)

(56) References Cited

U.S. PATENT DOCUMENTS 8,761,099 B2 6/2014 Charbit et al.
8,804,689 B2 8/2014 Madan et al.
(Continued)

FOREIGN PATENT DOCUMENTS

CN 103229582 A 7/2013
CN 103580814 2/2014
(Continued)

OTHER PUBLICATIONS

Zhang et al., "Interference-aware graph based resource sharing for device-to-device communications underlaying cellular networks," IEEE Wireless Communications and Networking Conference (WCNC), Apr. 7-10, 2013, pp. 140-145.
(Continued)

*Primary Examiner* — Alvin Zhu
(74) *Attorney, Agent, or Firm* — JCIPRNET

(57) ABSTRACT

A resource selection method and a wireless device are disclosed. The method includes: determining whether the wireless device is desired to broadcast a first scheduling assignment (SA) signal in an SA slot of an SA phase; if yes, selecting an SA broadcasting resource for broadcasting the first SA signal based on a first list and a second list recorded by the wireless device; if no, listening to all SA channels included in an SA channel resource pool, and removing a first SA channel from the first list after a second SA signal being carried on the first SA channel is listened to.

38 Claims, 14 Drawing Sheets

(51) Int. Cl.
*H04W 72/04* (2009.01)
*H04W 76/02* (2009.01)
*H04W 72/00* (2009.01)
*H04W 72/02* (2009.01)

(52) U.S. Cl.
CPC ..... *H04W 72/1268* (2013.01); *H04W 76/023* (2013.01); *H04W 76/14* (2018.02); *H04W 72/02* (2013.01)

(58) Field of Classification Search
CPC ............. H04W 72/04; H04W 72/0453; H04W 72/0493; H04W 72/1257
See application file for complete search history.

(56) References Cited

U.S. PATENT DOCUMENTS

| | | | |
|---|---|---|---|
| 8,848,700 | B2 | 9/2014 | Ahn et al. |
| 2009/0034465 | A1 | 2/2009 | Papasakellariou et al. |
| 2010/0135227 | A1 | 6/2010 | Jang et al. |
| 2013/0010767 | A1* | 1/2013 | Wang .................. H04W 72/005 370/336 |
| 2013/0128858 | A1 | 5/2013 | Zou et al. |
| 2013/0188546 | A1 | 7/2013 | Turtinen et al. |
| 2014/0146762 | A1 | 5/2014 | Kuo |
| 2014/0269338 | A1 | 9/2014 | Jung et al. |
| 2014/0295832 | A1 | 10/2014 | Ryu et al. |
| 2014/0301228 | A1 | 10/2014 | Kwak et al. |
| 2014/0307611 | A1 | 10/2014 | Tesanovic et al. |
| 2014/0307642 | A1* | 10/2014 | Wanstedt ............ H04W 76/023 370/329 |
| 2014/0328329 | A1 | 11/2014 | Novlan et al. |
| 2015/0245193 | A1* | 8/2015 | Xiong ................. H04W 76/023 370/328 |
| 2015/0245334 | A1* | 8/2015 | Chang .................. H04W 72/02 370/329 |
| 2016/0095099 | A1* | 3/2016 | Yang ........................ H04L 5/00 370/330 |
| 2016/0255615 | A1* | 9/2016 | Chatterjee ......... H04W 36/0055 370/330 |

FOREIGN PATENT DOCUMENTS

| | | |
|---|---|---|
| CN | 103974288 | 8/2014 |
| CN | 102917376 B | 11/2014 |
| TW | 201433199 | 8/2014 |

OTHER PUBLICATIONS

Peng et al., "A resource allocation scheme for D2D multicast with QoS protection in OFDMA-based systems ," IEEE 24th International Symposium on Personal Indoor and Mobile Radio Communications: Mobile and Wireless Networks (PIMRC), Sep. 8-11, 2013, pp. 2383-2387.

Xu et al., "Resource allocation using a reverse iterative combinatorial auction for device-to-device underlay cellular networks," IEEE Global Communications Conference (GLOBECOM), Dec. 3-7, 2012, pp. 4542-4547.
Chen et al., "QoS-based resource allocation scheme for Device-to-Device (D2D) communication underlaying cellular network in uplink," IEEE International Conference on Signal Processing, Communication and Computing (ICSPCC), Aug. 5-8, 2013, pp. 1-4.
Chae et al., "Radio Resource Allocation Scheme for Device-to-Device Communication in Cellular Networks Using Fractional Frequency Reuse" 17th Asia-Pacific Conference on Communications (APCC), Oct. 2-5, 2011, pp. 58-62.
3GPP, "Study on LTE device to device proximity services; Radio aspects," 3GPP TR 36.843 V12.0.1, Mar. 2014, pp. 1-50.
Yu et al., "Resource Sharing Optimization for Device-to-Device Communication Underlaying Cellular Networks," IEEE Transactions on Wireless Communications, Aug. 2011, pp. 2752-2763.
Feng et al., "Device-to-Device Communications Underlaying Cellular Networks," IEEE Transactions on Communications, Aug. 2013, pp. 3541-3551.
Chao et al., "Bio-Inspired Proximity Discovery and Synchronization for D2D Communications," IEEE Communications Letters, Dec. 2013, pp. 2300-2303.
Mo et al., "Comparison of Multichannel MAC Protocols," IEEE Transactions on Mobile Computing, Jan. 2008, pp. 50-65.
Zhang et al., "TMMAC: An Energy Efficient Multi-Channel MAC Protocol for Ad Hoc Networks," IEEE International Conference on Communications, Jun. 24-28, 2007, pp. 3554-3561.
3GPP TS 36.843 V12.0.1 "3rd Generation Partnership Project; Technical Specification Group Radio Access Network; Study on LTE Device to Device Proximity Services; Radio Aspects", Mar. 2014.
Alcatel-Lucent Shanghai Bell, Alcatel-Lucent, "T-RPT design and resource hopping for SA", 3GPP TSG RAN WG1 Meeting #78bis R1-144067, Oct. 6-10, 2014.
ITRI, "Discussion on the Reservation Bit in SA Content for D2D Broadcast Communications", 3GPP TSG-RAN WG1 Meeting #78bis R1-144239, Oct. 6-10, 2014.
"Office Action of Taiwan Counterpart Application", dated Aug. 26, 2016, p. 1-p. 5.
Alcatel-Lucent Shanghai Bell, Alcatel-Lucent, "Resourse allocation and selection for scheduling assignment for D2D communication", 3GPP TSG RAN WG1 Meeting#78, R1-143019, Aug. 18-22, 2014, pp. 1-4.
3GPP RAN1#78 Meeting Report, Aug. 18-22, 2014, MARITIM Hotel Dresden (Dresden, Germany), retrieved from http://std-share.itri.org.tw/Report/More?ClassID=1&id=275.
Huawei, HiSilicon, "SA content for D2D broadcast communication",3GPP TSG RAN WG1 Meeting#78, R1-142838, Aug. 18-22, 2014, pp. 1-4.
"Office Action of Taiwan Counterpart Application," dated Oct. 24, 2017, p. 1-p. 11.

* cited by examiner

If the wireless device broadcasts first SA signal by using a first SA broadcasting resource in a first sub-phase of an SA phase, listening to at least one first available SA channel other than the first SA broadcasting resource in the first sub-phase ~S1610

Selecting an SA broadcasting resource for broadcasting second SA signal based on a default probability in a second sub-phase of the SA phase, wherein the second SA broadcasting resource is corresponding to one of the at least one first available SA channel ~S1620

FIG. 16

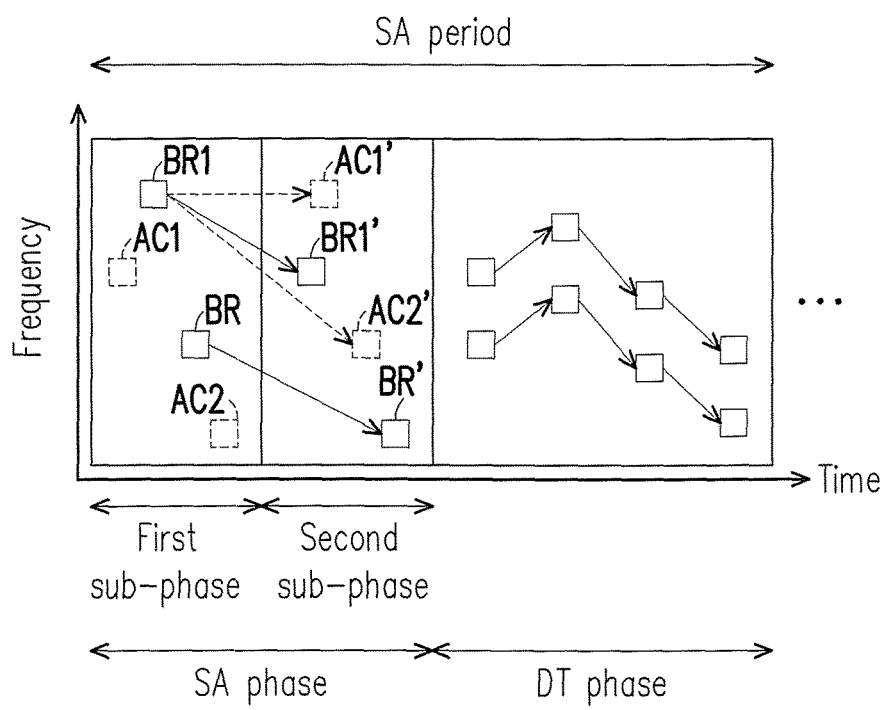

FIG. 17

RESOURCE SELECTION METHOD AND WIRELESS DEVICE

CROSS-REFERENCE TO RELATED APPLICATION

This application claims the priority benefits of U.S. provisional application Ser. No. 62/087,236, filed on Dec. 4, 2014 and Taiwan application serial no. 104120971, filed on Jun. 29, 2015. The entirety of each of the above-mentioned patent applications is hereby incorporated by reference herein and made a part of this specification.

TECHNICAL FIELD

The disclosure is directed to a resource selection method and a wireless device.

BACKGROUND

How to appropriately design a medium access control (MAC) protocol for broadcasting communication of wireless devices without the support of base stations to avoid data collisions between the wireless devices and further provide quality of service (QoS) has been a major subject at present.

Taking device-to-device (D2D) broadcasting communication in the long term evolution advanced (LTE-A) technique for example, in order to reduce complexity of D2D devices, a radio access network 1 (RAN1) team of third generation partnership project (3GPP) assumes a transmission mechanism for the D2D devices as having no feedback message and in a half-duplex mode. In the assumption of no feedback message, no matter whether receiving a broadcasting message successfully or unsuccessfully, a D2D device cannot inform a D2D device broadcasting the information of the situation. Meanwhile, in an assumption that the D2D device is operated in the half-duplex mode, the D2D device cannot listen to statuses of channels while broadcasting.

SUMMARY

The disclosure provides a resource selection method and a wireless device, by which each wireless device can find out an unused scheduling assignment (SA) channel for broadcasting SA signal based on a specific mechanism in an SA phase.

According to at least one embodiment of the disclosure, a resource selection method adapted to a wireless device is provided. The method includes: determining whether the wireless device is desired to broadcast scheduling a first assignment (SA) signal in an SA slot of an SA phase; if yes, selecting an SA broadcasting resource for broadcasting the first SA signal based on a first list and a second list recorded by the wireless device; and if not, listening to all SA channels included in an SA channel resource pool, and after a second SA signal being carried on a first SA channel is listened to, removing the first SA channel from the first list; wherein the first list records available SA channel in the SA channel resource pool, and the second list records used SA channel in the SA channel resource pool.

According to at least one embodiment of the disclosure, a wireless device including a storage circuit, a communication circuit and a processor is provided. The storage circuit stores a plurality of modules. The processor is coupled to the storage circuit and the communication circuit, accesses and executes the modules. The modules include a determination module, a selection module and a list updating module. The determination module determines whether the wireless device is desired to broadcast a first SA signal in an SA slot of an SA phase. The selection module selecting an SA broadcasting resource for broadcasting the first SA signal based on a first list and a second list recorded by the wireless device when the wireless device is desired to broadcast the first SA signal. The list updating module controls the communication circuit to listen to all SA channels included in an SA channel resource pool, and remove a first SA channel from the first list after a second SA signal being carried on the first SA channel is listened to when the wireless device is not desired to broadcast the first SA signal. The first list records available SA channel in the SA channel resource pool, and the second list records used SA channel in the SA channel resource pool.

According to at least one embodiment of the disclosure, a resource selection method adapted to a wireless device is provided. The method includes: if the wireless device broadcasts a first SA signal by using a first SA broadcasting resource in a first sub-phase of an SA phase, listening to at least one first available SA channel other than the first SA broadcasting resource in the first sub-phase; and selecting a second SA broadcasting resource for broadcasting second SA signal based on a predefined probability in a second sub-phase of the SA phase, wherein the second SA broadcasting resource is corresponding to one of the at least one first available SA channel.

According to at least one embodiment of the disclosure, a wireless device including a storage circuit, a communication circuit and a processor is provided. The storage circuit stores a plurality of modules. The processor is coupled to the storage circuit and the communication circuit, accesses and executes the modules. The modules include a control module and a selection module. If the wireless device broadcasts a first SA signal by using a first SA broadcasting resource in a first sub-phase of an SA phase, the control module controls the communication circuit to listen to at least one first available SA channel other than the first SA broadcasting resource in the first sub-phase. The selection module selects a second SA broadcasting resource for broadcasting second SA signal based on a predefined probability in a second sub-phase of the SA phase, wherein the second SA broadcasting resource is corresponding to one of the at least one first available SA channel.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 16 is a flowchart illustrating a resource selection method according to an embodiment of the disclosure.

FIG. 17 is a schematic diagram of resource selection according to an embodiment of the disclosure.

DETAILED DESCRIPTION OF DISCLOSED EMBODIMENTS

Figure 1:
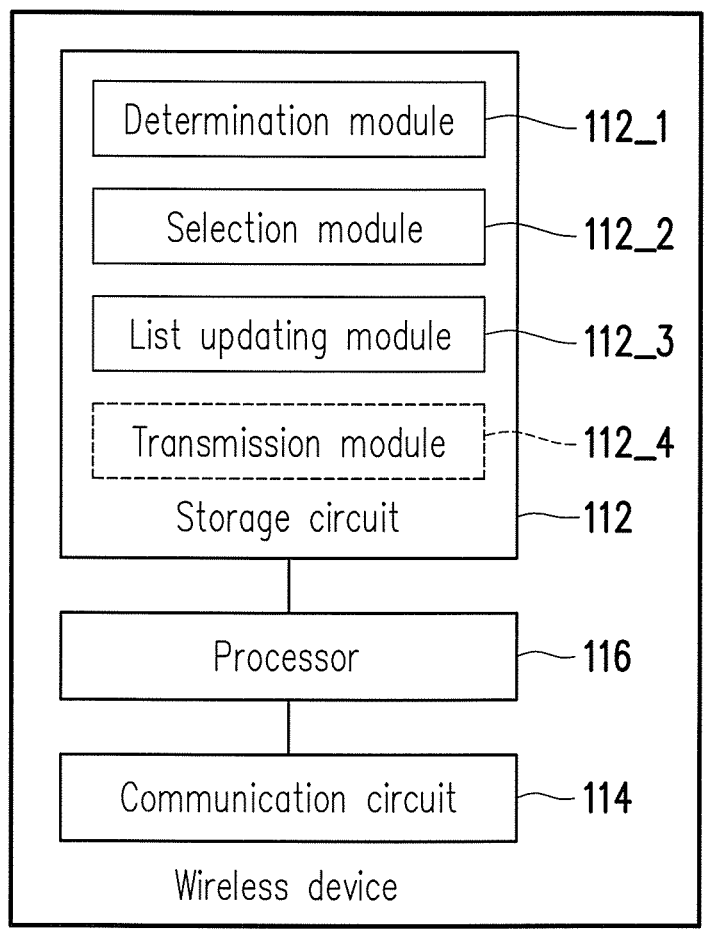
FIG. 1 is a schematic diagram illustrating a wireless device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

It should be understood that the disclosure is applied to a wireless device environment without the support of base stations, and in the disclosure, a D2D device is illustrated as an example for describing the disclosure, but the disclosure is not limited to the application in the D2D environment. FIG. 1 is a schematic diagram illustrating a wireless device according to an embodiment of the disclosure. In the present embodiment, a wireless device 100 is, for example, a D2D device operated in a half-duplex mode and is not controlled by a control node. The control node is, for example, an evolved node B (eNB) or another coordinator device in an infrastructure, which may be incapable of arranging the wireless device 100 for D2D communication due to failure or malfunction, but the disclosure is not limited thereto. The wireless device 100 may include a storage circuit 112, a communication circuit 114 and a processor 116. The storage circuit 112 may be, for example, a memory, a hard disk drive or any other element used for storing data and may be configured to record a plurality of program codes or modules. The communication circuit 114 may include a transmitter circuit, an analog-to-digital (A/D) converter, a D/A converter, a low noise amplifier (LNA), a mixer, a filter, a matching circuit, a transmission line, a power amplifier (PA), one or more antenna circuits and local storage media components (but the disclosure is not limited thereto) for providing wireless transmission/receiving functions to the wireless device 100 illustrated in FIG. 1.

The processor 116 is coupled to the storage circuit 112 and the communication circuit 114 and may be a general purpose processor, a specific purpose processor, a conventional processor, a digital signal processor (DSP), a plurality of microprocessors, one or more microprocessors integrated with a DSP core, a controller, a micro-controller, an application specific integrated circuit (ASIC), a field programmable gate array (FPGA), any other type of integrated circuit, a state machine, an advanced RISC machine-based processor or the like.

In the present embodiment, the processor 116 may access and execute a determination module 112_1, a selection module 112_2 and a list updating module 112_3 in the storage circuit 112 and perform a resource selection method in accordance with the disclosure.

Figure 2:
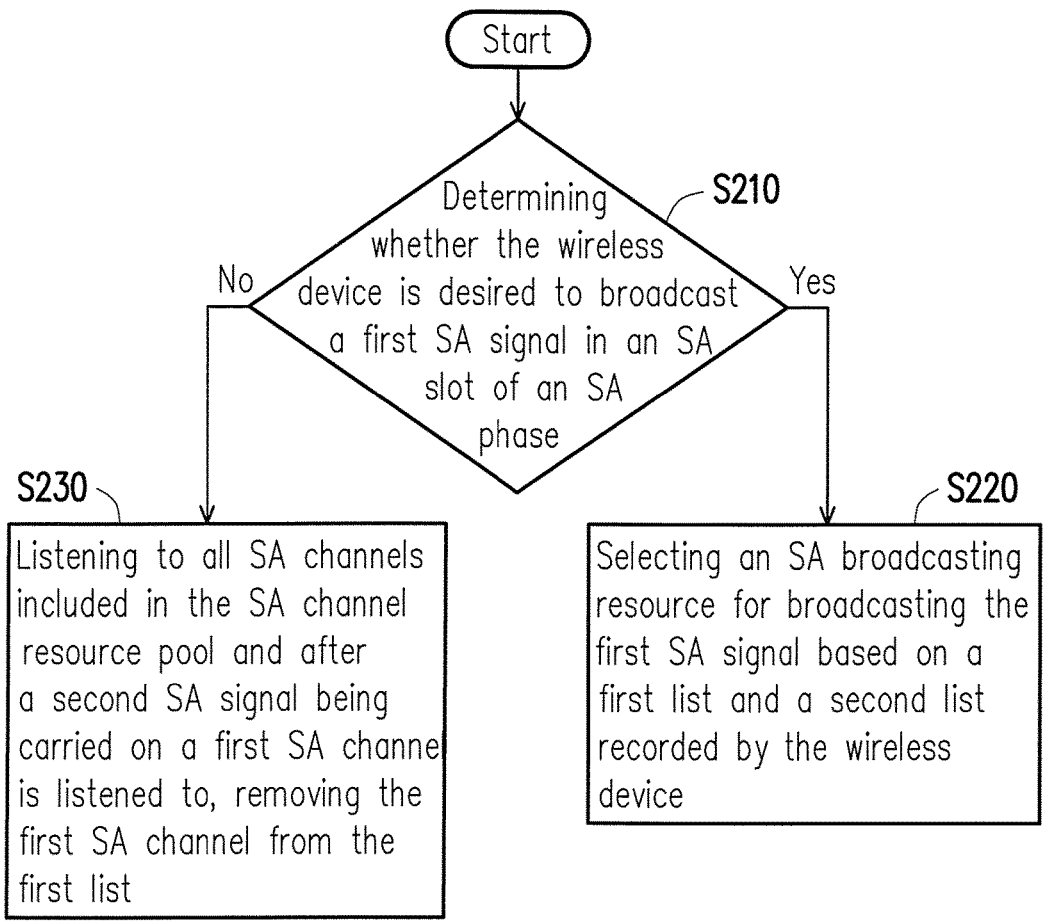
FIG. 2 is a flowchart illustrating a resource selection method according to an embodiment of the disclosure.

With reference to FIG. 2, FIG. 2 is a flowchart illustrating a resource selection method according to an embodiment of the disclosure. The method of the present embodiment may be performed by the wireless device 100 of FIG. 1, and each step of the method will be described with reference to each element depicted in FIG. 1.

First, in step S210, the determination module 112_1 may determine whether the wireless device 100 is desired to broadcast a first SA signal in an SA slot of an SA phase. In an embodiment, an SA phase may include a plurality of SA slots, and a probability for the wireless device 100 to serve as a broadcasting source in each SA slot is, for example, $p_t$. In other words, in each SA slot, the wireless device 100 has a probability of $(1-p_t)$ to serve as a receiver. For descriptive convenience, a wireless device 100 having the first SA signal to be broadcasted and serving as a broadcasting source in the SA slot is referred to as a D2D transmitter (D2D TX). On the other hand, a wireless device 100 having the first SA signal to be broadcasted but serving as a receiver in the SA slot is referred to a D2D receiver (D2D RX). In the application, the term "SA signal" could be generally understood as any kind of control signals transmitted before transmitting actual data signal.

If the wireless device 100 is desired to broadcast the first SA signal in the SA slot (i.e., the wireless device 100 serves as the D2D TX), in step S220, the selection module 112_2 my select an SA broadcasting resource for broadcasting the first SA signal based on a first list and a second list recorded by the wireless device 100. In an embodiment, the first list may record available SA channel in an SA channel resource pool, and the second list may record used SA channel in the SA channel resource pool. The SA channel resource pool may include all SA channel resources that may be selected by the wireless device 100 in the SA phase.

In different embodiments, the SA broadcasting resource may be implemented as a form of frequency division multiplex (FDM) channels or SA hopping patterns according to a designer's demand, but the feasible embodiments of the disclosure are not limited thereto. When the SA broadcasting resource is implemented as the form of FDM channels, the D2D TX may keep using a selected FDM channel for broadcasting the first SA signal. For instance, if it is assumed that the D2D TX selects a FDM channel (e.g., a specific band) numbered as 0 in a certain SA slot of the SA phase, the D2D TX may select the No. 0 FDM channel for broadcasting the first SA signal. Furthermore, when the SA broadcasting resource is implemented as the form of SA hopping pattern, the D2D TX may keep selecting a selected SA hopping pattern for broadcasting the first SA signal in the same way. For instance, if it is assumed that the D2D TX selects an SA hopping pattern numbered as 0 in a certain SA slot of the SA phase, the D2D TX may select the No. 0 SA hopping pattern for broadcasting the first SA signal.

Referring to FIG. 2 again, if, in step S210, the determination module determines that the wireless device 100 is not desired to broadcast the first SA signal in the SA slot (i.e., the wireless device 100 is the D2D RX), in step S230, the list updating module 112_3 may control the communication circuit 114 to listen to all SA channels included in the SA channel resource pool and after a second SA signal being carried on a first SA channel is listened to, remove the first SA channel from the first list. In this way, the wireless device 100 may be prevented from selecting a resource already selected by another D2D TX in the remaining SA slots of the SA phase.

Figure 3:
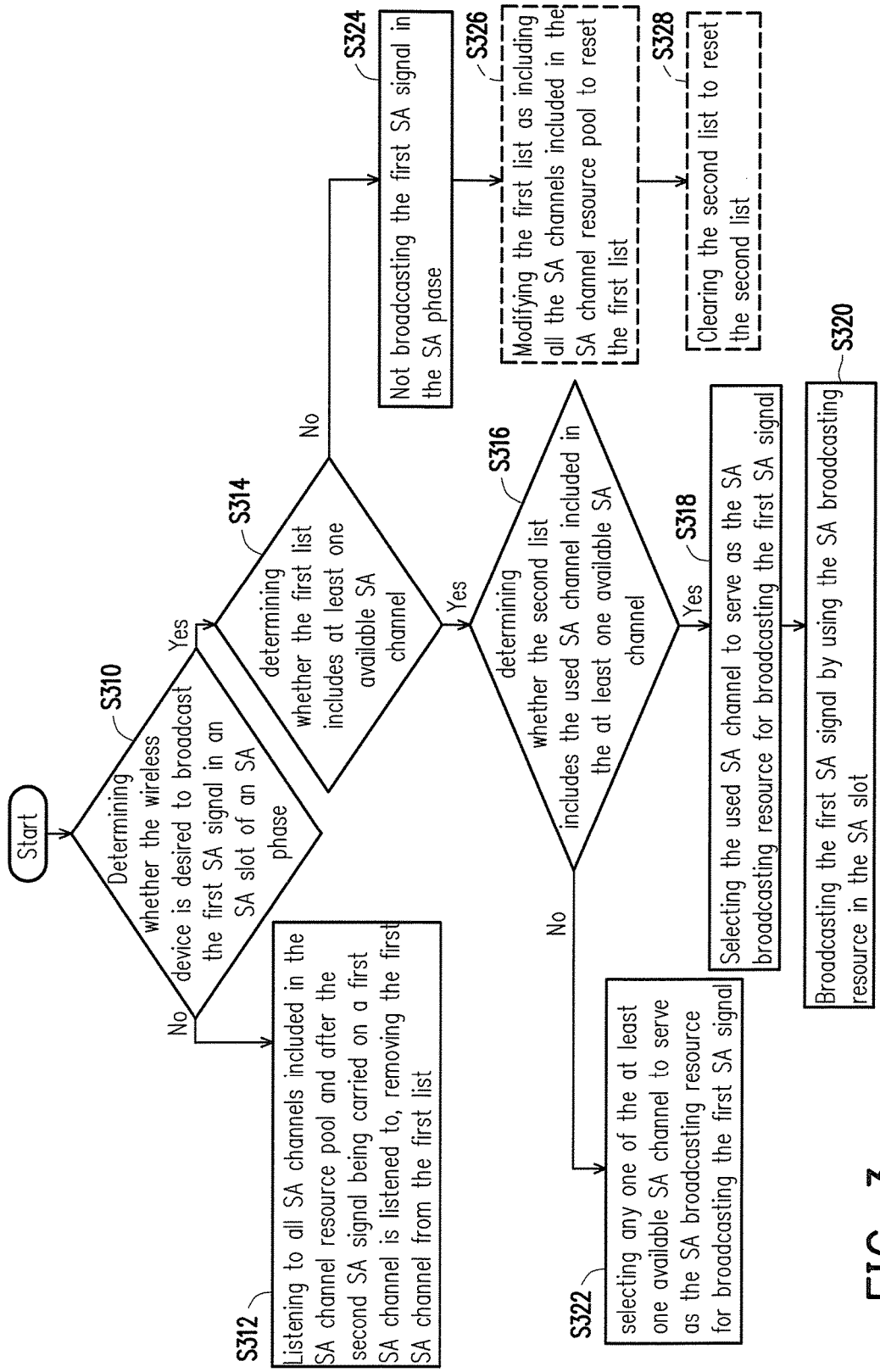
FIG. 3 is a flowchart illustrating the resource selection method according to the embodiment depicted in FIG. 2.

In short, when being operated as the D2D RX in a certain SA slot of the SA phase, the wireless device 100 may learn a currently used SA broadcasting resource (e.g., an FDM channel or an SA hopping pattern) by listening to the SA signal broadcasted by another D2D TX. Then, when being operated as a D2D TX in the remaining SA slots of the same SA phase, the wireless device 100 may select an available SA broadcasting resource that is not yet used for broadcasting the first SA signal based on the first list and the second list, so as to avoid colliding with another D2D TX. FIG. 3 is further illustrated to describe FIG. 2.

With reference to FIG. 3, FIG. 3 is a flowchart illustrating the resource selection method according to the embodiment depicted in FIG. 2. In the present embodiment, details with respect to steps S310 and S312 may refer to steps S210 and S230 in FIG. 2 and will not be repeated hereinafter.

In an embodiment, if the wireless device 100 is operated as the D2D TX in the SA slot of the SA phase, in step S314, the selection module 112_2 may determine whether the first list includes at least one available SA channel. If yes, it represents that there is SA channel which is not selected by another D2D TX in the SA channel resource pool. Thus, the selection module 112_2 may, in step S316, continue to determine whether the second list includes the at least one available SA channel, i.e., to determine whether the second list includes the used SA channel included in the at least one available SA channel. If yes, it represents that the D2D TX has selected the available SA channel in former SA slots of the SA phase. Thus, the selection module 112_2 may, in step S318, continue to select the used SA channel as the SA broadcasting resource for broadcasting the first SA signal.

However, if, in step S316, the selection module 112_2 determines that the second list does not include the used SA channel included in the at least one available SA channel, the selection module 112_2 may, in step S322, continue to select any one of the at least one available SA channel to serve as the SA broadcasting resource for broadcasting the first SA signal. In other embodiments, the selection module 112_2 may further add the selected available SA channel to the second list after step S322 for recording the SA channels selected by the wireless device 100. In an embodiment, the storage circuit 112 may further include a transmission module 112_4 configured to control the communication circuit 114 to broadcast the first SA signal by using the SA broadcasting resource in the SA slot in step S320.

Additionally, if, in step S314, the selection module 112_2 determines that the first list does not include any available SA channel, it represents that all the SA channels in the SA channel resource pool is selected by another D2D TX. Thus, in an embodiment, in step S324, the selection module 112_2 may not broadcast the first SA signal in the SA phase, so as to avoid collision with another D2D TX. In this condition, since the wireless device 100 will not attempt to broadcast the first SA signal in the remaining SA slots of the SA phase, the election module 112_2, in step S326, may modify the first list as including all the SA channels included in the SA channel resource pool to reset the first list. Meanwhile, the selection module 112_2, in step S328, may also clear the second list to reset the second list. In other embodiments, when the SA slot is the last slot of the SA phase, the selection module 112_2 may also perform steps S326 and S328 to reset the first list and the second list in the same way for getting ready for performing the resource selection method in the next SA phase.

Generally, an SA phase and its corresponding data transmission (DT) phase may constitute an SA period. A DT phase commonly appears at a certain time point after an SA phase, in which each D2D TX may broadcast data by using a DT broadcasting resource according to the transmission status of the first SA signal in the SA phase. Being similar to the SA broadcasting resource, a DT broadcasting resource may also implemented in a form of FDM channels, time division multiplex (TDM) channels, data hopping patterns and time resource patterns of transmission (T-RPT) according to the designer's demand, but the feasible embodiments of the disclosure are not limited thereto.

In an embodiment, each SA broadcasting resource in the SA phase may be one-to-one corresponding to each DT broadcasting resource in the DT phase. Thus, after the wireless device 100 selects the SA broadcasting resource based on FIG. 2, the transmission module 112_4 may control the communication circuit 114 to broadcast data to be transmitted by using a DT broadcasting resource one-to-one corresponding to the SA broadcasting resource in the DT phase. Since the wireless device 100 may be prevented from selecting the SA broadcasting resource identical to another D2D TX by using the method depicted in FIG. 2 to avoid collision while broadcasting the first SA signal, in the condition that the SA broadcasting resources are one-to-one corresponding to the DT broadcasting resources, the wireless device 100 may also be prevented from selecting the DT broadcasting resource identical to another D2D TX, so as to avoid collision while broadcasting the data to be transmitted.

Figure 4:
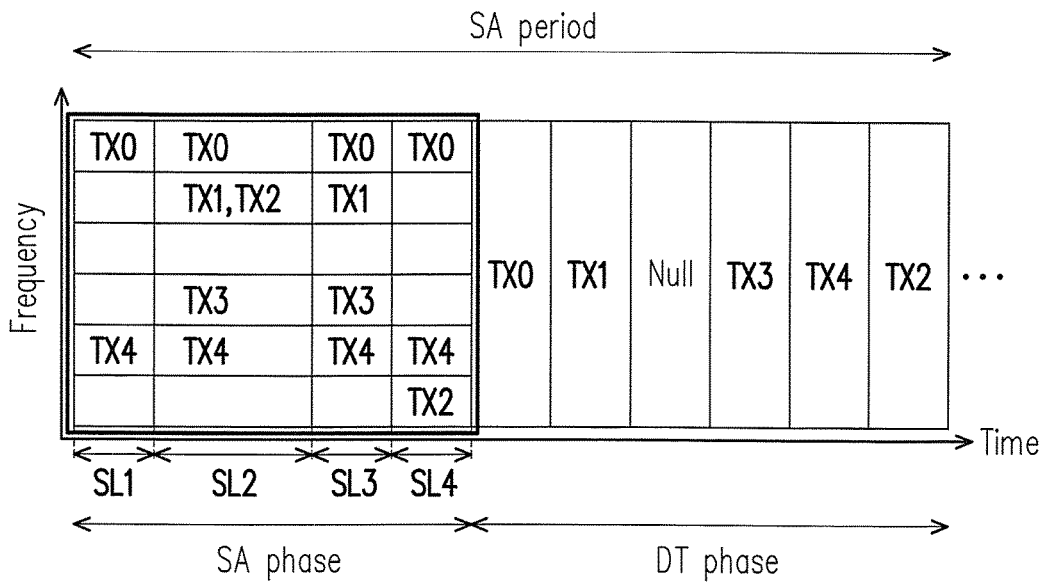
FIG. 4 is a schematic illustrating the SA broadcasting resources and the data Transmission (DT) broadcasting resources according to an embodiment of the disclosure.

With reference to FIG. 4, FIG. 4 is a schematic illustrating the SA broadcasting resources and the DT broadcasting resources according to an embodiment of the disclosure. In the present embodiment, it is assumed that an SA phase is composed of 4 SA slots and 6 bands, and each SA broadcasting resource in the SA phase is one-to-one corresponding to each DT broadcasting resource in a DT phases.

Additionally, broadcasting resources TX0 to TX4 illustrated in FIG. 4 respectively represent broadcasting resources selected by No. 0 to No. 4 D2D TX (which are referred to as D2D TX0 to D2D TX4). In the present embodiment, each SA broadcasting resource in the SA phase is implemented as an FDM channel, for example, and each DT broadcasting resource in the DT phase is implemented as a TDM channel, for example. As previously mentioned, when the SA broadcasting resource is implemented as the FDM channel, the D2D TX may use the selected FDM channel for broadcasting the first SA signal. Taking a D2D TX0 for example, when the D2D TX0 selects the broadcasting resource TX0 (i.e., an SA broadcasting resource) in a SA slot SL1 and is also desired to transmit the first SA signal in all SA slots SL2 to SL4, the D2D TX0 may broadcast the first SA signal by using the FDM channel of the same band in the remaining SA slots SL2 to SL4 of the SA phase. Further, taking the D2D TX3 for example, when the D2D TX3 selects the broadcasting resources TX3 (i.e., an SA broadcasting resource) in the SA slot SL2 and is desired to transmit the first SA signal in the SA slot SL3, the D2D TX3 may broadcast the first SA signal by using the FDM channel of the same band in the SA slot SL3.

In addition, since each SA broadcasting resource (i.e., each FDM channel) in the SA phase is assumed as one-to-one corresponding to each DT broadcasting resource (i.e., each TDM channel) in the DT phase, the D2D TX0 to D2D TX4 have the corresponding DT broadcasting resources in the DT phase. A DT broadcasting resource marked as "null" represents that no D2D TX selects the corresponding SA broadcasting resource.

Figure 5:
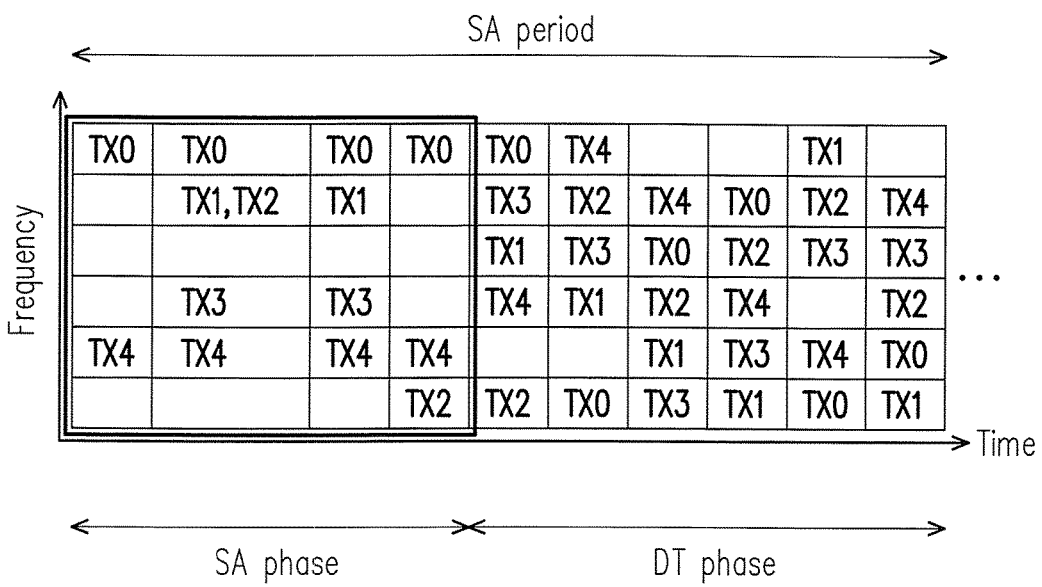
FIG. 5 is a schematic illustrating the SA broadcasting resources and the DT broadcasting resources according to an embodiment of the disclosure.

With reference to FIG. 5, FIG. 5 is a schematic illustrating the SA broadcasting resources and the DT broadcasting resources according to an embodiment of the disclosure. The assumption of the present embodiment is substantially the same as the assumption in FIG. 4. The difference between the present embodiment and the embodiment illustrated in FIG. 4 merely lies in that each DT broadcasting resource in the DT phase is implemented as a data hopping pattern in the present embodiment. Since each SA broadcasting resource (i.e., each FDM channel) in the SA phase is assumed as one-to-one corresponding to each DT broadcasting resource (i.e., each data hopping pattern) in the DT phase, all the D2D TX0 to D2D TX4 have the corresponding DT broadcasting resources (i.e., the data hopping patterns) in the DT phase.

Figure 6:
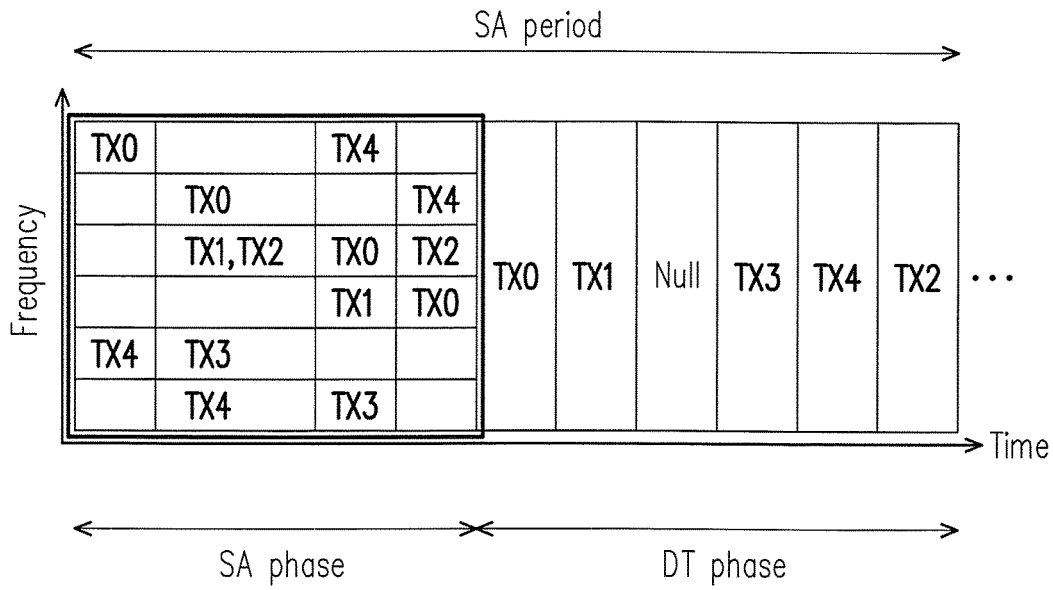
FIG. 6 is a schematic illustrating the SA broadcasting resources and the DT broadcasting resources according to an embodiment of the disclosure.

With reference to FIG. 6, FIG. 6 is a schematic illustrating the SA broadcasting resources and the DT broadcasting resources according to an embodiment of the disclosure. The assumption of the present embodiment is substantially the same as the assumption in FIG. 4. The difference between the present embodiment and the embodiment illustrated in FIG. 4 merely lies in that each SA broadcasting resource in the SA phase of is implemented as an SA hopping pattern in the present embodiment. Since each SA broadcasting resource (i.e., each SA hopping pattern) in the SA phase is assumed as one-to-one corresponding to each DT broadcasting resource (i.e., each TDM channel) in the DT phase, all the D2D TX0 to D2D TX4 have the corresponding DT broadcasting resources (i.e., the TDM channels) in the DT phase.

Figure 7:
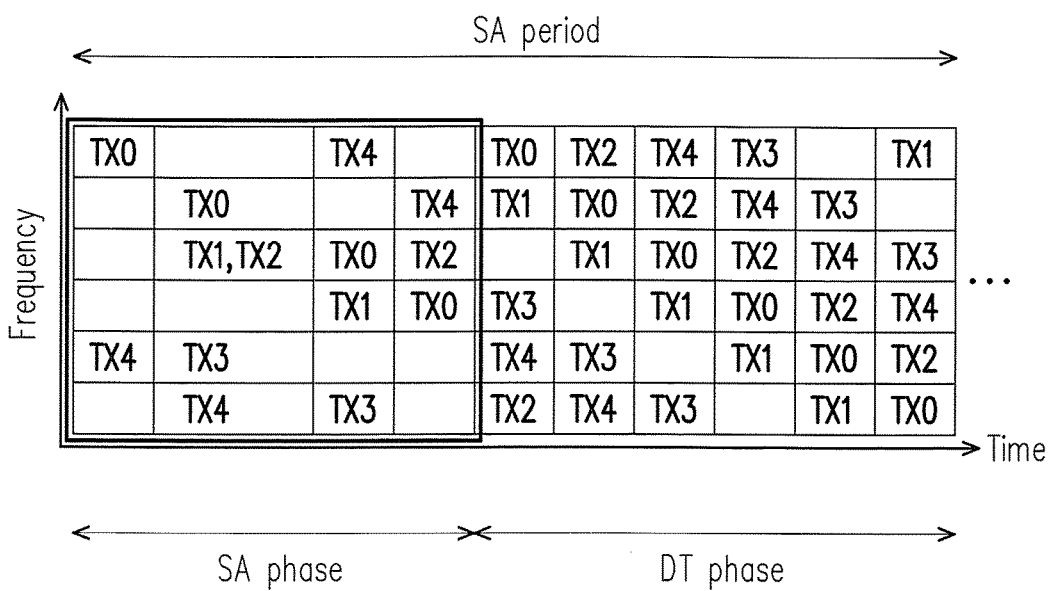
FIG. 7 is a schematic illustrating the SA broadcasting resources and the DT broadcasting resources according to an embodiment of the disclosure.

With reference to FIG. 7, FIG. 7 is a schematic illustrating the SA broadcasting resources and the DT broadcasting resources according to an embodiment of the disclosure. The assumption of the present embodiment is substantially the same as the assumption in FIG. 6. The difference between the present embodiment and the embodiment illustrated in FIG. 6 merely lies in that each DT broadcasting resource in the DT phase is implemented as a data hopping pattern in the present embodiment. Since each SA broadcasting resource (i.e., each SA hopping pattern) in the SA phase is assumed as one-to-one corresponding to each DT broadcasting resource (i.e., each data hopping pattern) in the DT phase, all the D2D TX0 to D2D TX4 have the corresponding DT broadcasting resources (i.e., the data hopping patterns) in the DT phase.

Figure 8:
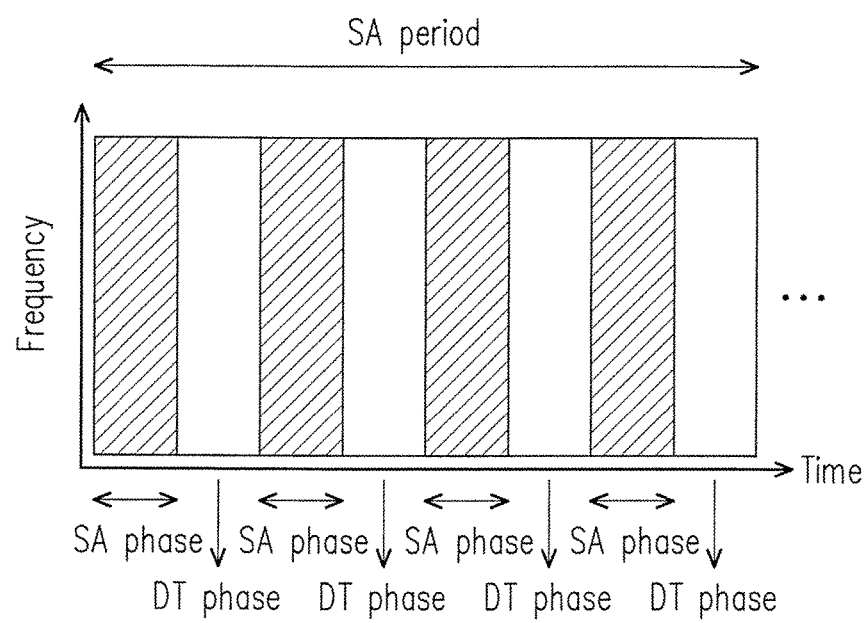
FIG. 8 is a schematic diagram illustrating an SA period including a plurality of SA phases and a plurality of DT phases according to an embodiment of the disclosure.

FIG. 4 through FIG. 7 illustrates an implementation that an SA phase and a DT phase constitute an SA period; however, in other embodiments, an SA period may also be implemented as including a plurality of SA phases and a plurality of DT phases. With reference to FIG. 8, FIG. 8 is a schematic diagram illustrating an SA period including a plurality of SA phases and a plurality of DT phases according to an embodiment of the disclosure. In the present embodiment, an SA period may include 4 SA phases and 4 DT phases which are alternately arranged. In each SA phase, the wireless device 100 may perform the method illustrated in FIG. 2 once (which may be considered as an SA phase including one SA slot). If serving as the D2D TX and selecting an SA broadcasting resource in the SA phase, the wireless device 100 may use a DT broadcasting resource for transmission right after the DT phase corresponding to the SA phase.

In another embodiment, the DT broadcasting resources in the DT phase may be more than the SA broadcasting resources in the SA phase. In this circumstance, the method in accordance with the disclosure may further facilitate in reducing probability of the collision occurring in the DT phase by means of a specific mechanism. To be detailed, the wireless device 100 may record a data resource list including the DT broadcasting resources. When the data resource list is empty, it means there is no available DT broadcasting resource. If the wireless device 100 is desired to broadcast the first SA signal, the selection module 112_2 may control the communication circuit 114 to announce a first DT broadcasting resource among the DT broadcasting resources in the first SA signal, and broadcast the first SA signal by using the SA broadcasting resource in the SA slot. Then, the selection module 112_2 may control the communication circuit 114 to broadcast the data to be transmitted by using the first DT broadcasting resource in the DT phase. Namely, the selection module 112_2 may inform another D2D RX to avoid selecting the first DT broadcasting resource by announcing the first DT broadcasting resource in the first SA signal.

On the other hand, if the wireless device 100 is not desired to broadcast the first SA signal, the list updating module 112_3 may control the communication circuit 114 to listen to a second DT broadcasting resource announced in a second SA signal (i.e., another SA signal broadcasted by another D2D TX) and remove the second DT broadcasting resource from the data resource list. In this way, the wireless device 100 may be prevented from selecting the same DT broadcasting resource of another D2D TX. Additionally, if the second DT broadcasting resource is identical to the previously selected first DT broadcasting resource, the list updating module 112_3 may select a third DT broadcasting resource from the data resource list and control the communication circuit 114 to broadcast the data to be transmitted by using the third DT broadcasting resource in the DT phase. In this way, the wireless device 100 may have a higher probability to select a resource which is not selected by another D2D TX, so as to reduce the probability of the occurrence of the collision.

In other embodiments, the method in accordance with the disclosure may guarantee QoS of the wireless device 100 by means of a data header of the data to be transmitted or setting at least one reservation bit in the first SA signal. The reservation bit may be configured to indicate whether to preferentially transmit a third SA signal in an SA phase of another SA period. If the reservation bit indicates to preferentially transmit said third SA signal in said another SA period, the transmission module 112_4 may control the communication circuit 114 to broadcast said third SA signal by using another SA broadcasting resource corresponding to the SA broadcasting resource in an initial slot of said another SA phase.

Figure 9:
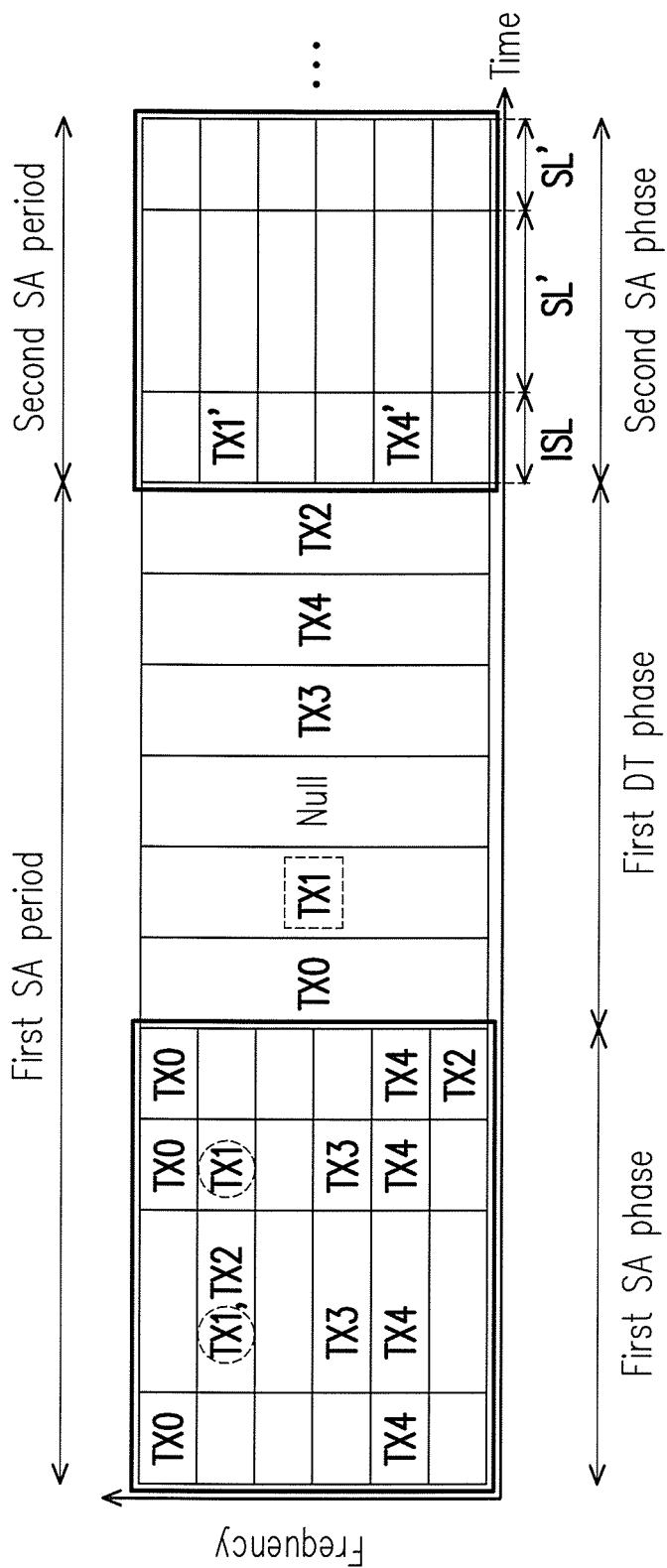
FIG. 9 is a schematic diagram of guaranteeing quality of service (QoS) by means of the reservation bit according to an embodiment of the disclosure.

With reference to FIG. 9, FIG. 9 is a schematic diagram of guaranteeing QoS by means of the reservation bit according to an embodiment of the disclosure. In the present embodiment, it is assumed that the D2D TX1 is desired to indicate in the first SA period to preferentially transmit a third SA signal in a second SA phase of a second SA period, the D2D TX1 may achieve the purpose by modifying a reservation bit in the first SA signal when transmitting the first SA signal by using the selected SA broadcasting resource (i.e., the broadcasting resource TX1 marked by a dotted circle). In other embodiments, it is assumed that the reservation bit is set in a data header of the data to be transmitted, the D2D TX1 may achieve the purpose by modifying the reservation bit in the data header of the data to be transmitted when transmitting the data to be transmitted by using the selected DT broadcasting resource (i.e., the broadcasting resource TX1 marked by a dotted block). In this way, the D2D TX1 may broadcast the first SA signal by using a broadcasting resource TX1' (e.g., a resource corresponding to the same channel of the broadcasting resource TX1 of a first SA phase) in an initial slot ISL of the second SA phase.

Furthermore, in another embodiment, for example, it is assumed that the D2D TX4 is also desired to indicate in the first SA period to preferentially transmit the third SA signal in the second SA phase of the second SA period, the D2D TX4 may also achieve the purpose by modifying the reservation bit of the first SA signal of each broadcasting resource TX4 in the first SA period, or modifying the reservation bit of the data header of the data to be transmitted in each broadcasting resource TX4 in the first DT period based on the teaching described above in the same way. Thereby, the D2D TX4 may broadcast the first SA signal by using a broadcasting resource TX4' (e.g., a resource corresponding to the same channel of the broadcasting resource TX4 of the first SA phase) in the initial slot ISL of the second SA phase.

Then, the D2D TX1 and the D2D TX4 requesting for the QoS may respectively select the SA broadcasting resources in each of at least one remaining slot SL' following the initial slot ISL of the second SA phase based on the method illustrated in FIG. 2. Alternatively, the D2D TX1 and the D2D TX4 may also transmit the first SA signal based on methods illustrated in FIG. 10 and FIG. 11.

Figure 10:
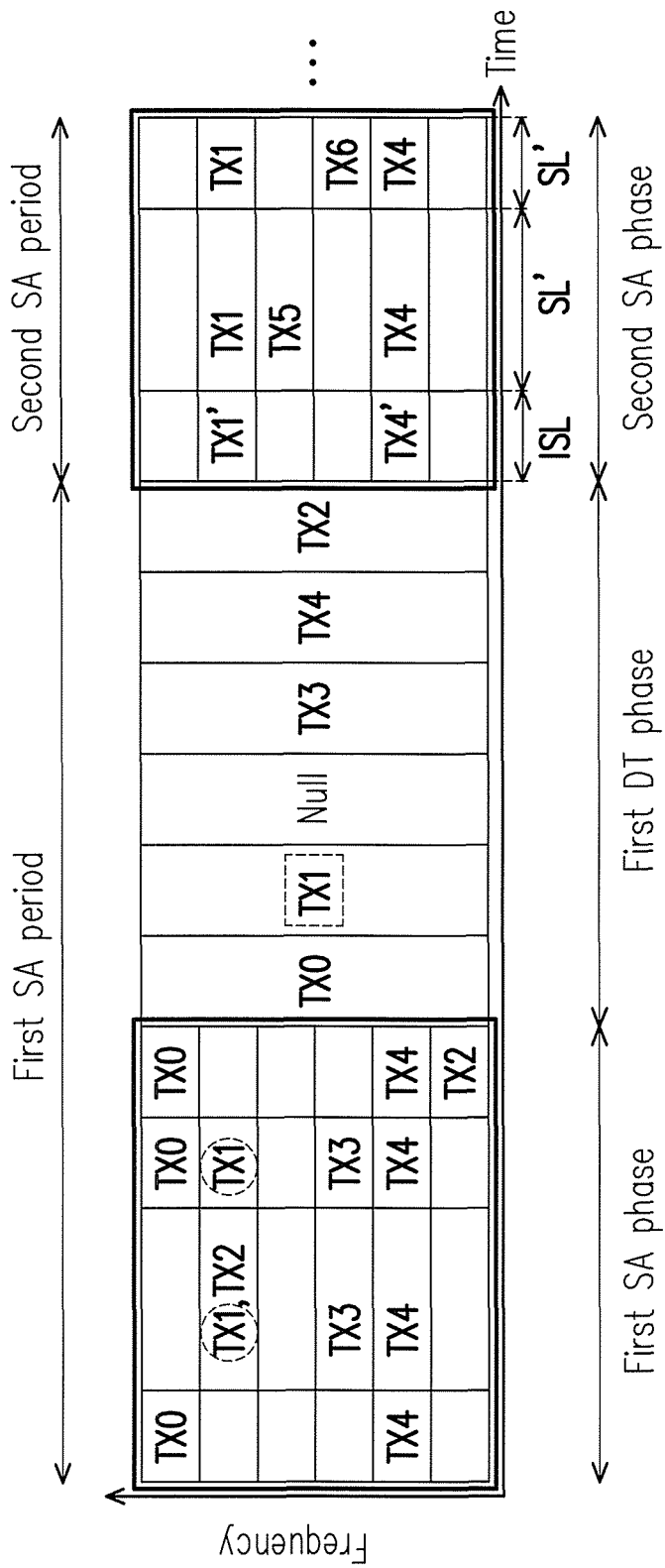
FIG. 10 is a schematic diagram of selecting the SA broadcasting resources in the second SA phase according to the embodiment depicted in FIG. 9.

With reference to FIG. 10, FIG. 10 is a schematic diagram of selecting the SA broadcasting resources in the second SA phase according to the embodiment depicted in FIG. 9. In the present embodiment, the D2D TX1 may use the same channel of the broadcasting resource TX1 in the first SA phase for broadcasting the first SA signal in the remaining slot(s) SL' of the second SA phase. Similarly, the D2D TX4 may also use the same channel of the broadcasting resource TX4 in the first SA phase for broadcasting the first SA signal in the remaining slot(s) SL' of the second SA phase.

Figure 11:
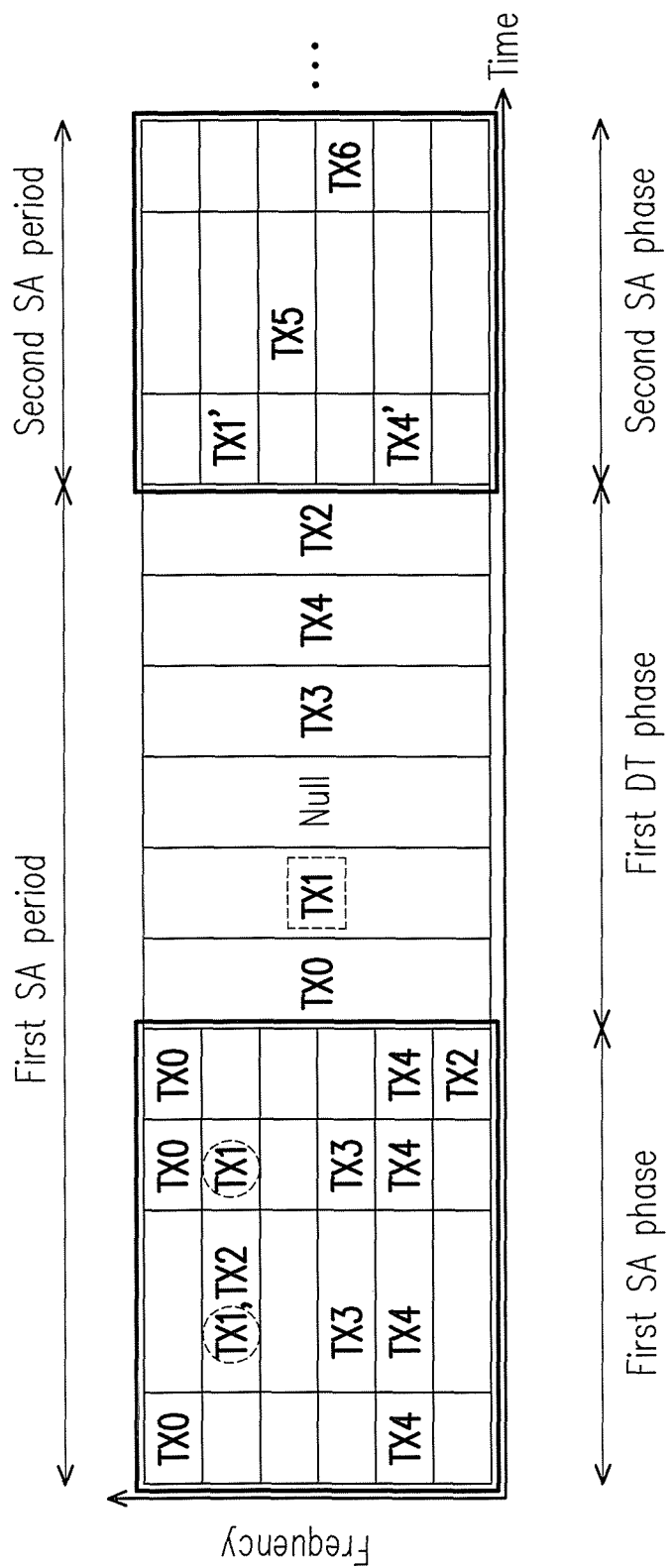
FIG. 11 is a schematic diagram of selecting the SA broadcasting resources in the second SA phase according to the embodiment depicted in FIG. 9.

With reference to FIG. 11, FIG. 11 is a schematic diagram of selecting the SA broadcasting resources in the second SA phase according to the embodiment depicted in FIG. 9. In the present embodiment, the D2D TX1 may completely not broadcast in the remaining slot(s) SL' of the second SA phase. Similarly, the D2D TX4 may completely not broadcast in the remaining slot(s) SL' of the second SA phase.

In other embodiments, the method in accordance with the disclosure may meet different QoS requests by modifying the content of the third SA signal preferentially transmitted in an SA phase of another SA period. For instance, said third SA signal may be modified as being configured to request for preferentially selecting an SA broadcasting resource for broadcasting the first SA signal, preferentially selecting a DT broadcasting resource for broadcasting the data to be transmitted, preferentially selecting a data transmission pattern, or preferentially selecting an SA channel resource pool, but the disclosure is not limited thereto.

In addition, even though the broadcasting resources in the second SA period are illustrated as being arranged after the channels (i.e., the bands) corresponding to the same broadcasting resources in the first SA period in FIG. 9 through FIG. 11, in other embodiments, the broadcasting resources in the second SA period may also be corresponding to channels different from the broadcasting resources in the first SA period. In other words, the reservation bit may also be configured to request for using a SA broadcasting resource in another SA channel resource pool.

Figure 12:
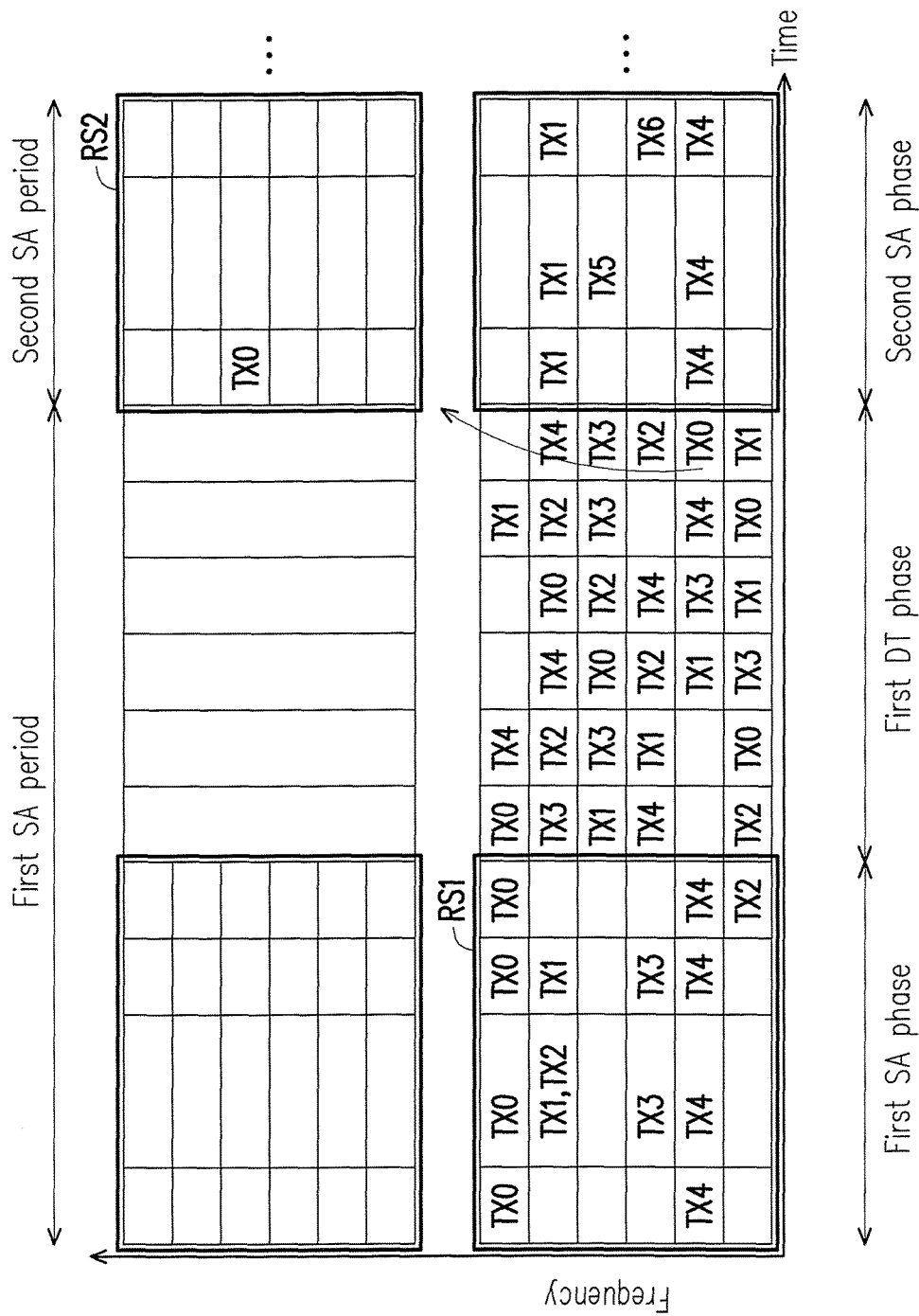
FIG. 12 is a schematic diagram of requesting for using an SA broadcasting resource in another SA channel resource pool by means of the reservation bit according to the embodiment depicted in FIG. 9.

With reference to FIG. 12, FIG. 12 is a schematic diagram of requesting for using an SA broadcasting resource in another SA channel resource pool by means of the reservation bit according to the embodiment depicted in FIG. 9. In the present embodiment, the D2D TX0 may modify a reservation bit in the data header of the data to be transmitted which is indicated by an arrow to request for using an SA broadcasting resource in an SA channel resource pool RS2. Referring to FIG. 12, the SA channel resource pools RS2 and RS1 are corresponding to different channels.

Figure 13:
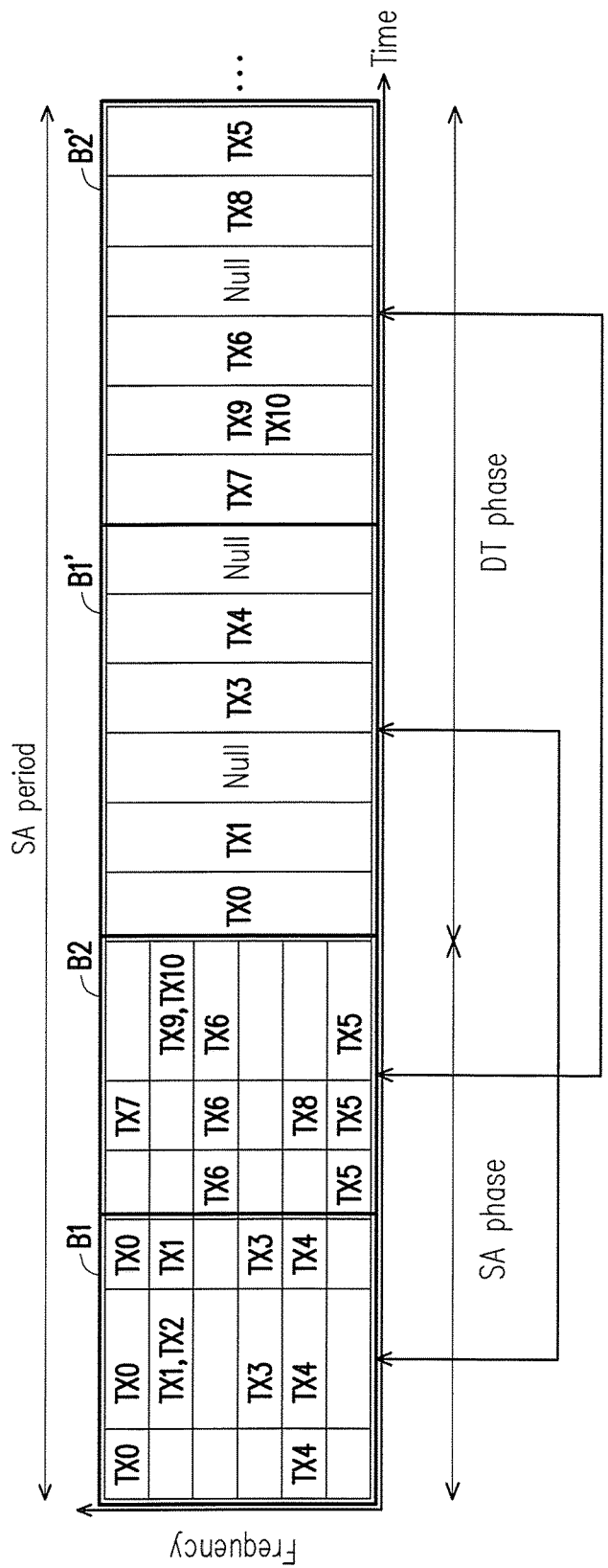
FIG. 13 is a schematic diagram of dividing an SA phase into a plurality of blocks according to an embodiment of the disclosure.

In other embodiments, an SA phase may be divided into a plurality of blocks based on time, and each block may be operated according to an independent communication mechanism. With reference to FIG. 13, FIG. 13 is a schematic diagram of dividing an SA phase into a plurality of blocks according to an embodiment of the disclosure. In the present embodiment, an SA phase may be divided into blocks B1 and B2. In a scenario that the DT broadcasting resource is implemented as a TDM channel, the DT phase may also be correspondingly divided into blocks B1' and B2'. As indicated by the arrows in the FIG. 13, the blocks B1 and B1' are corresponding to each other, and the blocks B2 and B2' are corresponding to each other. In an embodiment, the blocks B1 and B2 may be operated respectively according to different transmission mechanisms. For instance, the D2D TX0 to D2D TX4 belonging to the block B1 may be operated simply based on the method illustrated in FIG. 2, while D2D TX5 to D2D TX10 belonging to the block B2 may be designed as aspects of requesting for QoS by means of reservation bits, but the disclosure is not limited thereto.

Figure 14:
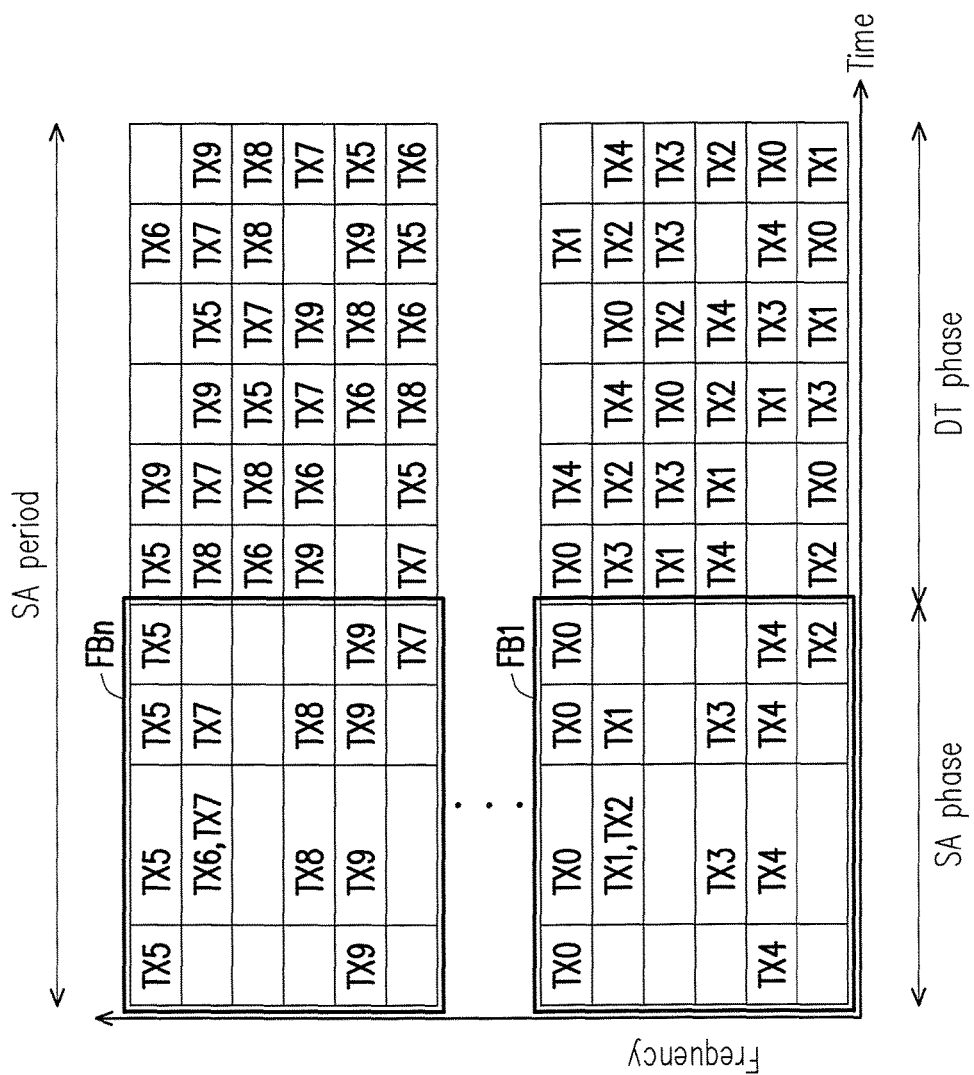
FIG. 14 is a schematic diagram of dividing an SA channel resource pool into a plurality of blocks according to an embodiment of the disclosure.

In other embodiments, an SA channel resource pool in an SA phase may also be divided into a plurality of blocks in a frequency domain for being used by D2D TX belonging to different groups. With reference to FIG. 14, FIG. 14 is a schematic diagram of dividing an SA channel resource pool into a plurality of blocks according to an embodiment of the disclosure. In the present embodiment, an SA channel resource pool in an SA phase may be divided into, for example, n (where n is a positive integer) blocks FB1 to FBn. Being similar to the embodiment illustrated in FIG. 13, the blocks FB1 to FBn may also be operated respectively according to different transmission mechanisms, which will not be repeatedly described hereinafter.

Figure 15:
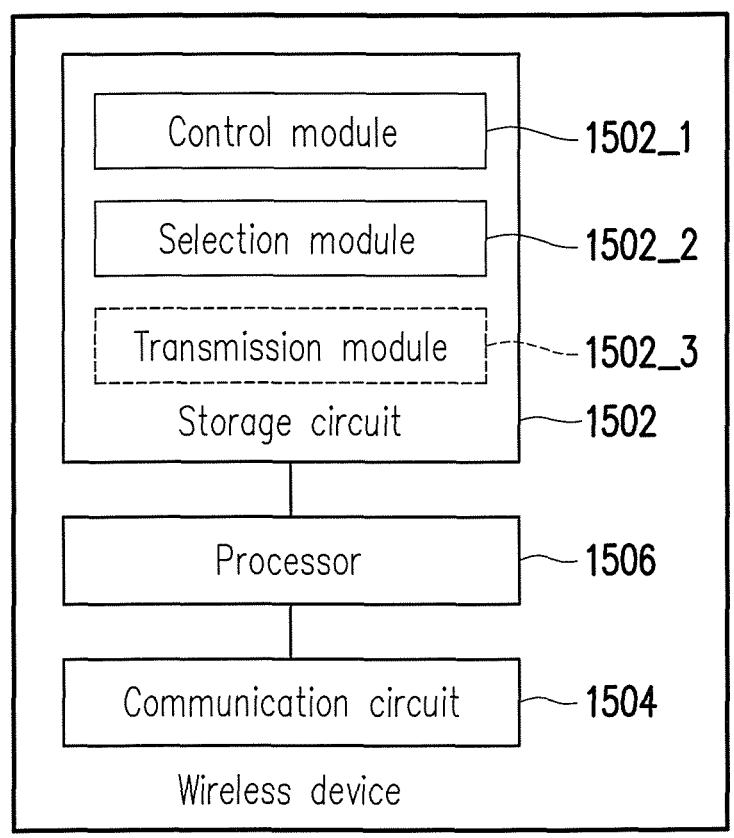
FIG. 15 is a schematic diagram illustrating a wireless device according to an embodiment of the disclosure.

Moreover, the disclosure further proposes a resource selection method and a wireless device according to another embodiment, which can also achieve the effect of avoiding the collision in the same way. With reference to FIG. 15, FIG. 15 is a schematic diagram illustrating a wireless device according to an embodiment of the disclosure. In the present embodiment, a wireless device 1500 includes a storage circuit 1502, a communication circuit 1504 and a processor 1506, and feasible embodying manners thereof may refer to the descriptions related to the storage circuit 112, the communication circuit 114 and the processor 116 illustrated in FIG. 1 and will not be repeatedly described hereinafter.

Being different from the embodiment illustrated in FIG. 1, the processor 1506 of FIG. 15 may access the control module 1502_1 and the selection module 1502_2 stored in the storage circuit 1502 to perform a resource selection method in accordance with the disclosure.

FIG. 16 is a flowchart illustrating a resource selection method according to an embodiment of the disclosure. The method illustrated in FIG. 16 may be performed by the wireless device 1500 illustrated in FIG. 1, and each step of the method will be described with reference to each element illustrated in FIG. 15.

First, in step S1610, if the wireless device 1500 broadcasts first SA signal by using a first SA broadcasting resource in a first sub-phase of the SA phase, the control module 1502_1 may control the communication circuit 1504 to listen to at least one first available SA channel other than the first SA broadcasting resource in the first sub-phase. Then, in step S1620, the selection module 1502_2 may select a second SA broadcasting resource for broadcasting the second SA signal based on a predefined probability in a second sub-phase of the SA phase. The second SA broadcasting resource is corresponding to one of the at least one first available SA channel. For clearly describing the concept of FIG. 16, FIG. 17 is further illustrated for the description.

FIG. 17 is a schematic diagram of resource selection according to an embodiment of the disclosure. In the present embodiment, the SA phase may be divided into the first sub-phase and the second sub-phase, for example. In the related art, the SA broadcasting resource in the first sub-phase is one-to-one corresponding to SA broadcasting resource of the second sub-phase, and the D2D TX may continuously use the corresponding SA broadcasting resources in the first sub-phase and the second sub-phase for transmitting the SA signal. For instance, it is assumed that SA broadcasting resources BR and BR' are corresponding to each other, and when a certain D2D TX selects the SA broadcasting resource BR for transmitting the SA signal in the first sub-phase, the D2D TX shall continue to select the SA broadcasting resource BR' for transmitting the SA signal in the second sub-phase. In this circumstance, if it is assumed that the D2D TX collides with another D2D TX when using the SA broadcasting resource BR in the first sub-phase, the two D2D TX will collide with each other again in the second sub-phase due to using the SA broadcasting resource BR'. Even worse, the two D2D TXs will collide with each other again and again in the following DT phases due to using the same DT broadcasting resource.

However, the aforementioned issue may be avoided through the method illustrated in FIG. 16. To be specific, if it is assumed that the wireless device 1500 selects the first SA broadcasting resource BR1 in the first sub-phase, the wireless device 1500 may listen to other available SA channels in the first sub-phase. When listening to first available SA channels AC1 and AC2 which are not yet selected by other D2D TX, the wireless device 1500 may learn that second available SA channels AC1' and AC2' (which are respectively corresponding to the first available SA channels AC1 and AC2) in the second sub-phase are not yet selected by another D2D TX. Thus, in the second sub-phase, the wireless device 1500 may select the second available SA channel AC1' or AC2' based on the predefined probability to serve as a second SA broadcasting resource for broadcasting the second SA signal.

In this way, even if the wireless device 1500 collides with another D2D TX due to selecting the first SA broadcasting resource BR1, the wireless device 1500 may still have a certain probability to avoid colliding with another D2D TX again in the second sub-phase. Moreover, the wireless device 1500 may further avoid a series of collisions that may occur in the following DT phases.

In an embodiment, if it is assumed that the predefined probability is Pc, and a number of the first available SA channels listened to by the wireless device 1500 in the first sub-phase is n, a probability for the wireless device 1500 to select one of the second available SA channels to serve as the second SA broadcasting resource may be Pc/n. Taking FIG. 17 for example, if the number of the first available SA channels listened to by the wireless device 1500 in the first sub-phase is 2, the probability for the wireless device 1500 to select one of the second available SA channels AC1' and AC2' is Pc/2. It may also be learned according to the present embodiment that the wireless device 1500 may still have a probability of (1−Pc) to select the second SA broadcasting resource BR1' originally corresponding to the first SA broadcasting resource BR1 to serve as the second SA broadcasting resource in the second sub-phase. Additionally, in other embodiments, the probability for the wireless device 1500 to select one of the second available SA channels may be adjusted as any value according to the designer's demand.

In other embodiments, the storage circuit 1502 may further include a transmission module 1502_3 configured to control the communication circuit 1504 to broadcast the second SA signal by using the second SA broadcasting resource. Additionally, being similar to the teaching in the preceding embodiments, the DT broadcasting resources in the DT phase may be one-to-one corresponding to the SA broadcasting resources in the SA phase. In this circumstance, the transmission module 1502_3 may control the communication circuit 1504 to broadcast first data to be transmitted by using a first DT broadcasting resource one-to-one corresponding to the first SA broadcasting resource and control the communication circuit 1504 to broadcast second data to be transmitted by using a second DT broadcasting resource one-to-one corresponding to the second SA broadcasting resource in the DT phase.

In an embodiment, the wireless device 1500 may further record a data resource list including the DT broadcasting resources. In the present embodiment, the control module 1502_1 may announce the first DT broadcasting resource among the DT broadcasting resources in the first SA signal. Meanwhile, the control module 1502_1 may control the communication circuit 1504 to broadcast the first data to be transmitted by using the first DT broadcasting resource in the DT phase. Additionally, the control module 1502_1 may also perform the same operation when transmitting the second SA signal in the second sub-phase, which will not be repeatedly described hereinafter. Furthermore, the control module 1502_1 may also control the communication circuit

1504 to listen to a second DT broadcasting resource announced in an SA signal carried on a used SA channel in the first sub-phase and remove the second DT broadcasting resource from the data resource list. If the second DT broadcasting resource is identical to the first DT broadcasting resource, the control module 1502_1 may select a third DT broadcasting resource from the data resource list and control the communication circuit 1504 to broadcast the first data to be transmitted by using the third DT broadcasting resource in the DT phase. Details of the present embodiment may refer to the teaching of the preceding embodiments and will not be repeatedly described.

In other embodiments, a data header of the first data to be transmitted, a data header of the second data to be transmitted, the first SA signal or the second SA signal may also contain at least one reservation bit configured to indicate whether to preferentially transmit another SA signal in an SA phase of another SA period. Various configurations, applications, functions of the reservation bit, and the resource selection mechanism of the wireless device 1500 in another SA phase may refer to the teaching of the preceding embodiments and will not be repeatedly described hereinafter.

In an embodiment, when the reservation bit indicates to preferentially transmit said another SA signal in said another SA period, the transmission module 1502_3 may be further configured to control the communication circuit 1504 to broadcast said another SA signal by using another SA broadcasting resource corresponding to the first SA broadcasting resource in said another first sub-phase of the SA phase. Meanwhile, the transmission module 1502_3 may be further configured to control the communication circuit 1504 to broadcast yet another SA signal by using said another SA broadcasting resource again in said another second sub-phase of the SA phase or by using yet another SA broadcasting resource which is different from said another SA broadcasting resource.

To summarize, in the resource selection method and the wireless device in accordance with the embodiments of the disclosure can the SA broadcasting resource for broadcasting the SA signal can be selected based on the recorded first list and second list. Since the wireless device serving as either the D2D TX or the D2D RX continuously updates the first and the second list according to an embodiment of the method, another SA broadcasting resource which is not yet selected by another D2D TX may be recursively selected. Therefore, in comparison with the method of randomly selecting the SA broadcasting resource in the related art, the method of the disclosure can avoid the collision more effectively. Meanwhile, when the SA phase is divided into the first sub-phase and the second sub-phase, the method in accordance with an embodiment of the disclosure can facilitate the wireless device in finding out an available SA channel which is not yet selected by another D2D TX in the first sub-phase and select the second SA broadcasting resource corresponding to the available SA channel based on the predefined probability in the second sub-phase, so as to reduce the probability of the occurrence of the collision. Moreover, through the mechanism of configuring the reservation bit in the data header of the data to be transmitted or configuring the reservation bit of the SA signal, the method in accordance with an embodiment of the disclosure could further facilitate in guaranteeing the QoS of the wireless device.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A resource selection method, adapted to a wireless device, comprising:
   determining whether the wireless device is desired to broadcast a first scheduling assignment (SA) signal in an SA slot of an SA phase;
   if the wireless device is desired to broadcast the first scheduling assignment (SA) signal in the SA slot of the SA phase, selecting an SA broadcasting resource for broadcasting the first SA signal based on a first list and a second list recorded by the wireless device; and
   if the wireless device is not desired to broadcast the first scheduling assignment (SA) signal in the SA slot of the SA phase, listening to all SA channels comprised in an SA channel resource pool, and after a second SA signal being carried on a first SA channel is listened to, removing the first SA channel from the first list,
   wherein the first list records available SA channel in the SA channel resource pool, and the second list records used SA channel in the SA channel resource pool.

2. The method according to claim 1, wherein the step of selecting the SA broadcasting resource for broadcasting the first SA signal based on the first list and the second list recorded by the wireless device comprises:
   determining whether the first list comprises at least one available SA channel; and
      if the first list comprises the at least one available SA channel, determining whether the second list comprises a used SA channel comprised in the at least one available SA channel,
         if the second list comprises the used SA channel comprised in the at least one available SA channel, selecting the used SA channel to serve as the SA broadcasting resource for broadcasting the first SA signal,
         if the second list does not comprise the used SA channel comprised in the at least one available SA channel, selecting any one of the at least one available SA channel to serve as the SA broadcasting resource for broadcasting the first SA signal.

3. The method according to claim 2, wherein if the first list does not comprise the at least one available SA channel, the method further comprises:
   not broadcasting the first SA signal in the SA phase;
   modifying the first list as comprising all the SA channels comprised in the SA channel resource pool to reset the first list; and
   clearing the second list to reset the second list.

4. The method according to claim 1, wherein the wireless device adopts a half-duplex mode to perform device-to-device (D2D) communication, and the wireless device is not controlled by a control node.

5. The method according to claim 1, wherein the wireless device further records a data resource list comprising data transmission (DT) broadcasting resource, and the method further comprises:
   if the wireless device is desired to broadcast the first SA signal, announcing a first DT broadcasting resource among the DT broadcasting resource in the first SA signal;
   broadcasting the first SA signal by using the SA broadcasting resource in the SA slot; and data to be transmitted by using the first DT broadcasting resource in a DT phase, wherein the SA phase and the DT phase constitute an SA period.

6. The method according to claim 5, wherein if the wireless device is not desired to broadcast the first SA signal, the method further comprises:
listening to a second DT broadcasting resource announced in the second SA signal, and removing the second DT broadcasting resource from the data resource list;
if the second DT broadcasting resource is identical to the first DT broadcasting resource, selecting a third DT broadcasting resource from the data resource list; and
broadcasting the data to be transmitted by using the third DT broadcasting resource in the DT phase.

7. The method according to claim 1, wherein after the step of selecting the SA broadcasting resource for broadcasting the first SA signal based on the first list and the second list recorded by the wireless device, the method further comprises:
broadcasting the first SA signal by using the SA broadcasting resource in the SA slot; and
data to be transmitted by using a DT broadcasting resource one-to-one corresponding to the SA broadcasting resource in a DT phase, wherein the SA phase and the DT phase constitute an SA period.

8. The method according to claim 7, wherein a data header of the data to be transmitted or the first SA signal contains at least one reservation bit configured to indicate whether to preferentially transmit a third SA signal in an SA phase of another SA period.

9. The method according to claim 8, further comprising:
when the at least one reservation bit indicates to preferentially transmit said third SA signal in the SA phase of said another SA period, broadcasting said third SA signal by using another SA broadcasting resource corresponding to the SA broadcasting resource in an initial slot of an another SA phase.

10. The method according to claim 9, wherein the SA broadcasting resource and said another SA broadcasting resource belong to a second SA channel, and after the step of broadcasting said third SA signal by using another SA broadcasting resource corresponding to the SA broadcasting resource in the initial slot of said another SA phase, the method further comprises:
using the second SA channel to broadcast other SA signal in at least one remaining slot following the initial slot in said another SA phase, or
completely not broadcasting the other SA signal in the at least one remaining slot.

11. A wireless device, comprising:
a storage circuit, storing a plurality of modules;
a communication circuit; and
a processor, coupled to the storage circuit and the communication circuit, accessing and executing the modules, the modules comprising:
a determination module, determining whether the wireless device is desired to broadcast a first SA signal in an SA slot of an SA phase;
a selection module, selecting an SA broadcasting resource for broadcasting the first SA signal based on a first list and a second list recorded by the wireless device when the wireless device is desired to broadcast the first SA signal; and
a list updating module, controlling the communication circuit to listen to all SA channels comprised in an SA channel resource pool, and removing a first SA channel from the first list after a second SA signal being carried on the first SA channel is listened to when the wireless device is not desired to broadcast the first SA signal,
wherein the first list records available SA channel in the SA channel resource pool, and the second list records used SA channel in the SA channel resource pool.

12. The wireless device according to claim 11, wherein the selection module is configured to:
determine whether the first list comprises at least one available SA channel; and
if the first list comprises the at least one available SA channel, determine whether the second list comprises a used SA channel comprised in the at least one available SA channel,
if the second list comprises the used SA channel comprised in the at least one available SA channel, select the used SA channel to serve as the SA broadcasting resource for broadcasting the first SA signal,
if the second list does not comprise the used SA channel comprised in the at least one available SA channel, select any one of the at least one available SA channel to serve as the SA broadcasting resource for broadcasting the first SA signal.

13. The wireless device according to claim 12, wherein if the first list does not comprise the at least one available SA channel, the selection module is further is further configured to:
not broadcast the first SA signal in the SA phase;
modify the first list as comprising all the SA channels comprised in the SA channel resource pool to reset the first list; and
clear the second list to reset the second list.

14. The wireless device according to claim 11, wherein the wireless device adopts a half-duplex mode to perform device-to-device (D2D) communication, and the wireless device is not controlled by a control node.

15. The wireless device according to claim 11, wherein the wireless device further records a data resource list comprising data transmission (DT) broadcasting resource, and the selection module is further configured to:
announce a first DT broadcasting resource among the DT broadcasting resource in the first SA signal if the wireless device is desired to broadcast the first SA signal;
control the communication circuit to broadcast the first SA signal by using the SA broadcasting resource in the SA slot; and
control the communication circuit to broadcast data to be transmitted by using the first DT broadcasting resource in a DT phase, wherein the SA phase and the DT phase constitute an SA period.

16. The wireless device according to claim 15, wherein if the wireless device is not desired to broadcast the first SA signal, the list updating module is further configured to:
control the communication circuit to listen to a second DT broadcasting resource announced in the second SA signal, and remove the second DT broadcasting resource from the data resource list;
select a third DT broadcasting resource from the data resource list if the second DT broadcasting resource is identical to the first DT broadcasting resource; and
control the communication circuit to broadcast the data to be transmitted by using the third DT broadcasting resource in the DT phase.

17. The wireless device according to claim 11, further comprising a transmission module configured to:

control the communication circuit to broadcast the first SA signal by using the SA broadcasting resource in the SA slot; and control the communication circuit to broadcast data to be transmitted by using a DT broadcasting resource one-to-one corresponding to the SA broadcasting resource in a DT phase, wherein the SA phase and the DT phase constitute an SA period.

18. The wireless device according to claim 17, wherein a data header of the data to be transmitted or the first SA signal contains at least one reservation bit configured to indicate whether to preferentially transmit a third SA signal in an SA phase of another SA period.

19. The wireless device according to claim 18, wherein when the at least one reservation bit indicates to preferentially transmit said third SA signal in the SA phase of said another SA period, the transmission module is further configured to control the communication circuit to broadcast said third SA signal by using another SA broadcasting resource corresponding to the SA broadcasting resource in an initial slot of an another SA phase.

20. The wireless device according to claim 19, wherein the SA broadcasting resource and said another SA broadcasting resource belong to a second SA channel, and the transmission module is further configured to:

control the communication circuit to use the second SA channel to broadcast other SA signal in at least one remaining slot following the initial slot in said another SA phase, or control the communication circuit completely not to broadcasting the other SA signal in the at least one remaining slot.

21. A resource selection method, adapted to a wireless device, comprising:

if the wireless device broadcasts a first scheduling assignment (SA) signal by using a first SA broadcasting resource in a first sub-phase of an SA phase of an SA period, listening to at least one first available SA channel other than the first SA broadcasting resource in the first sub-phase; and selecting a second SA broadcasting resource for broadcasting a second SA signal based on a predefined probability in a second sub-phase of the SA phase, wherein the second SA broadcasting resource is corresponding to one of the at least one first available SA channel, and the SA period comprises the SA phase and a data transmission (DT) phase.

22. The method according to claim 21, wherein the wireless device adopts a half-duplex mode to perform D2D communication, and the wireless device is not controlled by a control node.

23. The method according to claim 21, wherein the predefined probability is Pc, a number of the at least one first available SA channel is n, and a probability of selecting the second SA broadcasting resource is Pc/n.

24. The method according to claim 21, wherein the wireless device further records a data resource list comprising data transmission (DT) broadcasting resources, and the method further comprises:

announcing a first DT broadcasting resource among the DT broadcasting resources in the first SA signal; and broadcasting first data to be transmitted by using the first DT broadcasting resource in a DT phase, wherein the first sub-phase, the second sub-phase and the DT phase constitute the SA period.

25. The method according to claim 24, further comprising:

listening to a second DT broadcasting resource announced in an SA signal carried on a used SA channel in the first sub-phase, and removing the second DT broadcasting resource from the data resource list;

if the second DT broadcasting resource is identical to the first DT broadcasting resource, selecting a third DT broadcasting resource from the data resource list; and broadcasting the first data to be transmitted by using the third DT broadcasting resource in the DT phase.

26. The method according to claim 21, wherein after the step of selecting the second SA broadcasting resource for broadcasting the second SA signal based on the predefined probability in the second sub-phase of the SA phase, the method further comprises:

broadcasting the second SA signal by using the second SA broadcasting resource; and broadcasting first data to be transmitted by using a first DT broadcasting resource one-to-one corresponding to the first SA broadcasting resource in a DT phase, and broadcasting second data to be transmitted by using a second DT broadcasting resource one-to-one corresponding to the second SA broadcasting resource, wherein the first sub-phase, the second sub-phase and the DT phase constitute the SA period.

27. The method according to claim 26, wherein a data header of the first data to be transmitted, a data header of the second data to be transmitted, the first SA signal or the second SA signal contains at least one reservation bit configured to indicate whether to preferentially transmit a third SA signal in an SA phase of another SA period.

28. The method according to claim 27, further comprising:

when the at least one reservation bit indicates to preferentially transmit said third SA signal in said another SA period, broadcasting said third SA signal by using another SA broadcasting resource corresponding to the first SA broadcasting resource in a first sub-phase of an another SA phase.

29. The method according to claim 28, further comprising:

broadcasting other SA signal by using said another SA broadcasting resource again in a second sub-phase of said another SA phase or by using yet another SA broadcasting resource different from said another SA broadcasting resource.

30. A wireless device, comprising:

a storage circuit, storing a plurality of modules;

a communication circuit; and a processor, coupled to the storage circuit and the communication circuit, accessing and executing the modules, the modules comprising:

a control module, if the wireless device broadcasts a first scheduling assignment (SA) signal by using a first SA broadcasting resource in a first sub-phase of an SA phase of an SA period, controlling the communication circuit to listen to at least one first available SA channel other than the first SA broadcasting resource in the first sub-phase; and a selection module, selecting a second SA broadcasting resource for broadcasting a second SA signal based on a predefined probability in a second sub-phase of the SA phase, wherein the second SA broadcasting resource is corresponding to one of the at least one first available SA channel, and the SA period comprises the SA phase and a data transmission (DT) phase.

31. The wireless device according to claim 30, wherein the wireless device adopts a half-duplex mode to perform D2D communication, and the wireless device is not controlled by a control node.

32. The wireless device according to claim 30, wherein the predefined probability is Pc, a number of the at least one first available SA channel is n, and a probability of selecting the second SA broadcasting resource is Pc/n.

33. The wireless device according to claim 30, wherein the wireless device further records a data resource list comprising data transmission (DT) broadcasting resources, and the control module is further configured to:
announce a first DT broadcasting resource among the DT broadcasting resources in the first SA signal; and
control the communication circuit to broadcast first data to be transmitted by using the first DT broadcasting resource in a DT phase, wherein the first sub-phase, the second sub-phase and the DT phase constitute the SA period.

34. The wireless device according to claim 33, wherein the control module is further configured to:
control the communication circuit to listen to a second DT broadcasting resource announced in an SA signal carried on a used SA channel in the first sub-phase, and remove the second DT broadcasting resource from the data resource list; and
select a third DT broadcasting resource from the data resource list if the second DT broadcasting resource is identical to the first DT broadcasting resource; and
control the communication circuit to broadcast the first data to be transmitted by using the third DT broadcasting resource in the DT phase.

35. The wireless device according to claim 30, further comprising a transmission module configured to:
control the communication circuit to broadcast the second SA signal by using the second SA broadcasting resource; and
control the communication circuit to broadcast first data to be transmitted by using a first DT broadcasting resource one-to-one corresponding to the first SA broadcasting resource in a DT phase, and control the communication circuit to broadcast second data to be transmitted by using a second DT broadcasting resource one-to-one corresponding to the second SA broadcasting resource, wherein the first sub-phase, the second sub-phase and the DT phase constitute the SA period.

36. The wireless device according to claim 35, wherein a data header of the first data to be transmitted, a data header of the second data to be transmitted, the first SA signal or the second SA signal contains at least one reservation bit configured to indicate whether to preferentially transmit a third SA signal in an SA phase of another SA period.

37. The wireless device according to claim 36, wherein when the at least one reservation bit indicates to preferentially transmit said third SA signal in said another SA period, the transmission module is further configured to control the communication circuit to broadcast said third SA signal by using another SA broadcasting resource corresponding to the first SA broadcasting resource in a first sub-phase of an another SA phase.

38. The wireless device according to claim 37, wherein the transmission module is further configured to control the communication circuit to broadcast other SA signal by using said another SA broadcasting resource again in a second sub-phase of said another SA phase or by using yet another SA broadcasting resource different from said another SA broadcasting resource.

* * * * *